E. L. McNett,
Governor.
N° 69,687.   Patented Oct. 8, 1867.

United States Patent Office.

ELI L. McNETT, OF CANTON, PENNSYLVANIA.

Letters Patent No. 69,687, dated October 8, 1867.

IMPROVEMENT IN GOVERNORS.

The Schedule referred to in these Letters Patent and making part of the same.

TO ALL WHOM IT MAY CONCERN:

Be it known that I, ELI L. McNETT, of Canton, in the county of Bradford, and State of Pennsylvania, have invented a new and useful Improvement in Governors; and I do hereby declare that the following is a full, clear, and exact description thereof, which will enable others skilled in the art to make and use the same, reference being had to the accompanying drawings, forming part of this specification.

This invention relates to a new and improved construction of governors for regulating the motion of steam engines, and it consists in devices for suspending the balls from a horizontal bar which is attached to the governor-spindle in such a manner that when the balls are at rest or drop to their lowest position, the rods which connect them with the bar hang vertical, and the balls hang free; and also in the connection of the balls by other rods to another bar on the spindle, and the connection of those rods to the sliding sleeve, which controls the valve of the engine or other motion.

Similar letters of reference indicate like parts.

A is the shaft or spindle of the governor. B is the sliding sleeve, which governs the action of the valve. C is the main horizontal bar, from which the balls are suspended. D is the secondary bar, which is attached to the spindle, and connected with the balls at each end by rods $a\ a$. $b\ b$ are the rods which connect the first bar C with the balls, and $d\ d$ are rods which are attached to the sleeve B and to the rods $a\ a$. E represents the balls.

Figure 1:
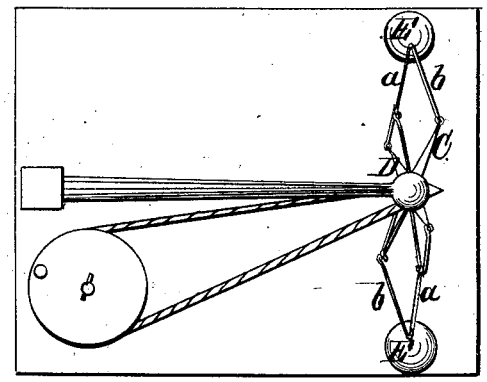
Figure 1 represents a top view of the governor with the balls expanded.
Figure 2:
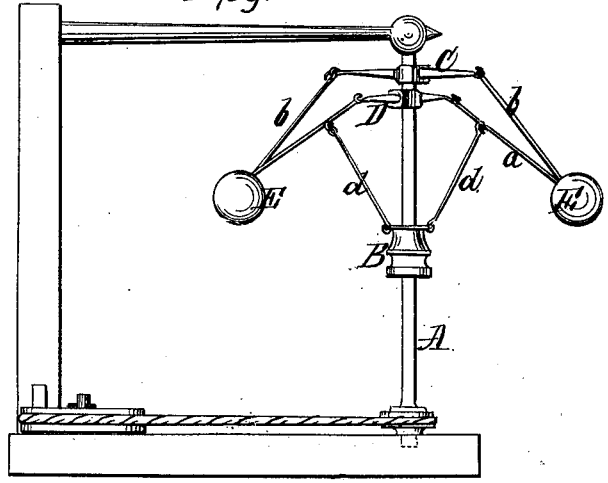
Figure 2 is an elevation of the governor, showing it as when in motion, or with the balls expanded.

The bars C and D are placed on the spindle at an angle to each other of about forty-five degrees, as seen in fig. 1. This gives the rods $a$ an angle with the governor-spindle which depends upon the length of the secondary bar D. The resistance to the centrifugal force of the balls is exerted on the rods $a$ by the rods $d$. In other words, the centrifugal force of the balls is retarded by the centripetal force of the resistance exerted on the sleeve B through the rods $d$. The balls when in a state of rest hang perfectly free, and when in motion they are not retarded or affected by friction, consequently the governor is very sensitive to any increase or decrease in the speed of the engine.

As the balls of centrifugal governors are usually hung, it requires a very sensible increase or decrease of speed to affect the balls or the valve, consequently they are poor regulators of motion. By suspending the balls according to my plan, the extreme sensitiveness of the governor occasioned thereby renders it a true regulator of motion. In the ordinary governor the centrifugal force alone causes the balls to be thrown out, said balls turning freely in either direction, but this is not the case with my invention. When the governor is in motion, the inertia of the balls has a tendency to keep them in the same position, resisting the centrifugal force, but the end of the bar D, crowding or pressing upon the end of the rod $a$, has a tendency to throw the balls directly out, and to straighten the angle at the point of connection of the bar D and rod $a$. As the former forces the balls outward, the rods $b$, supported from the bar C, lift the balls E independently of the centrifugal force caused by their revolutions. By this arrangement an increase of motion in one direction (forward) lifts the sleeve B slightly with a sudden jerk, but a sudden motion backward, or in an opposite direction, entirely overcomes the centrifugal force of the balls, and throws the sleeve downward for an instant. A sudden decrease of motion will, of course, when running backwards, throw the balls upward for an instant.

Having thus described my invention, what I claim as new, and desire to secure by Letters Patent, is—

1. The bars C upon the spindle A, connected to the balls E by the rods $b$, said balls connected to the short bar D on the spindle A, at an angle of about forty-five degrees with the bar C, by means of the rods $a$, which are connected to the sliding sleeve B by the rods $d$, all operating as described, whereby the momentum of the balls aids the centrifugal force to shut off the steam, and the inertia of the balls aids the centrifugal force to let on the steam, as herein shown and described.

2. The combination and arrangement of the cross-bars C D, rods $a\ b\ d$, balls E, and sliding sleeve B, as herein set forth for the purpose specified.

ELI L. McNETT.

Witnesses:
    J. E. BULLOCK,
    G. E. BULLOCK.